(12) United States Patent
Geng et al.

(10) Patent No.: US 10,395,108 B1
(45) Date of Patent: Aug. 27, 2019

(54) AUTOMATICALLY IDENTIFYING AND INTERACTING WITH HIERARCHICALLY ARRANGED ELEMENTS

(71) Applicant: Decision Engines, Inc., Palo Alto, CA (US)

(72) Inventors: Kunling Geng, Milpitas, CA (US); Sridhar Gunapu, Santa Clara, CA (US)

(73) Assignee: Decision Engines, Inc., Palo Alto, CA (US)

( * ) Notice: Subject to any disclaimer, the term of this patent is extended or adjusted under 35 U.S.C. 154(b) by 0 days.

(21) Appl. No.: 16/163,473

(22) Filed: Oct. 17, 2018

(51) Int. Cl.
*G06K 9/00* (2006.01)
*G06F 17/24* (2006.01)
(Continued)

(52) U.S. Cl.
CPC ........ *G06K 9/00449* (2013.01); *G06F 16/56* (2019.01); *G06F 16/5866* (2019.01);
(Continued)

(58) Field of Classification Search
CPC .................................................. G06F 16/5866
(Continued)

(56) References Cited

U.S. PATENT DOCUMENTS

| | | |
|---|---|---|
| 7,065,707 B2 | 6/2006 | Chen et al. |
| 2008/0120257 A1 * | 5/2008 | Goyal .............. G06F 17/243 706/12 |

(Continued)

OTHER PUBLICATIONS

Mandal, Sekhar, S. P. Chowdhury, Amit Kumar Das, and Bhabatosh Chanda. "A hierarchical method for automated identification and segmentation of forms." In Eighth International Conference on Document Analysis and Recognition (ICDAR'05), pp. 705-709. IEEE, 2005. (Year: 2005).*

(Continued)

*Primary Examiner* — Frank D Mills
(74) *Attorney, Agent, or Firm* — Hickman Palermo Becker Bingham LLP (57) ABSTRACT

A computer-implemented method of managing hierarchically arranged elements is disclosed. The method comprising: receiving, by a processor, a digital image of an electronic form having at least one group of elements, including at least one field that is programmed to receive input data; detecting, by the processor, a set of objects represented in the digital image; identifying, for each object of the set of objects, values for multiple attributes, including a type and a position, a value of the type being a group label corresponding to a group label in the electronic form, a field label corresponding to a field label in the electronic form, or a field corresponding to a field in the electronic form; building a set of feature vectors, including a feature vector for each pair of objects in the set of objects such that a first object of the pair has a type of a field and a second object of the pair has a type of a group label or a field label, the feature vector including a first feature for the type of each of the pair of objects and a second feature for the position of each of the pair of objects; determining, for each object of the set of objects having a type of a field, an associated group label and an associated field label based on the set of feature vectors; searching, for each of at least one the set of objects having a type of a field, a database for field data for the object based on the associated group label and the associated field label; causing, by the processor, displaying each of the at least one objects having a type of a field in association with the corresponding field data, thereby automatically completing the electronic form.

20 Claims, 8 Drawing Sheets

(51) Int. Cl.
  *G06N 3/08* (2006.01)
  *G06N 3/04* (2006.01)
  *G06F 16/56* (2019.01)
  *G06F 16/58* (2019.01)
  *G06T 7/73* (2017.01)

(52) U.S. Cl.
  CPC ....... *G06F 17/243* (2013.01); *G06K 9/00463* (2013.01); *G06K 9/00469* (2013.01); *G06N 3/0454* (2013.01); *G06N 3/08* (2013.01); *G06T 7/73* (2017.01); *G06T 2207/20084* (2013.01)

(58) Field of Classification Search
  USPC .......................................................... 715/226
  See application file for complete search history.

(56) References Cited

U.S. PATENT DOCUMENTS

| | | | |
|---|---|---|---|
| 2009/0110288 A1 | 4/2009 | Fujiwara | |
| 2016/0019197 A1* | 1/2016 | Iasi | G06F 17/243 715/224 |
| 2016/0217119 A1* | 7/2016 | Dakin | G06F 17/243 |
| 2017/0046622 A1* | 2/2017 | Gaither | G06F 17/2795 |

OTHER PUBLICATIONS

Kingma et al. "Adam: A method for stochastic optimization." arXiv preprint arXiv:1412.6980 (2014), 15 pages.
Caffe, "Deep Learning Framework", BAIR, http://caffe.berkeleyvision.org, last viewed on Oct. 18, 2018, 4 pages.
Colah's Blog, "Understanding LSTM Networks", dated Aug. 27, 2015, 15 pages.
GitHub, "models/research/object_detection at master" • tensorflow/models, https://github.com/tensorflow/models/tree/master/research/object_detection, last viewed on Oct. 18, 2018, 6 pages.
GitHub, Tesseract-ocr/tesseract: Tesseract Open Source OCR Engine (main repository), https://github.com/tesseract-ocr/tesseract, last viewed on Oct. 1, 2018, 4 pages.
Glorot et al., "Understanding the difficulty of training deep feedforward neural networks." Proceedings of the thirteenth international conference—artificial intelligence and statistics, 2010, 8 pgs.
He, Kaiming, et al. "Delving deep into rectifiers: Surpassing human-level performance on imagenet classification." Proceedings of the IEEE international conference on computer vision. 2015, 11 pages.
Hinton, Geoffrey E., et al. "Improving neural networks by preventing co-adaptation of feature detectors." arXiv preprint arXiv:1207.0580 (2012), 18 pages.
Amazon Mechanical Turk, "Human Intelligence Through an API". https://www.mturk.com/, last viewed on Oct. 1, 2018, 7 pages.
Keras: The Python Deep Learning library, "Keras", https://keras.io, last viewed on Oct. 18, 2018, 5 pages.
Wikipedia, "Activation Function", https://en.wikipedia.org/wiki/Activation_function, lasted viewed on Oct. 1, 2018, 5 pages.
Marszatek et al., "Semantic Hierarchies for Visual Object Recognition", Proceedings / CVPR, IEEE Computer Society Conference on Computer Vision and Pattern Recognition, dated Jun. 2007, 7 pages.
Mikolov, Tomas, et al. "Distributed representations of words and phrases and their compositionality." Advances in neural information processing systems. 2013, 9 pages.
MXNet, "Apache MXNet (Incubating) A flexible and efficient library for deep learning", MXNet 1.3.0 Released, https://mxnet.apache.org, last viewed on Oct. 18, 2018, 3 pages.
Pennington et al. "Glove: Global vectors for word representation", Proceedings of the 2014 conference on empirical methods in natural language processing (EMNLP). 2014, 12 pages.
PyTorch, "From Research to Production", https://pytorch.org, last viewed on Oct. 18, 2018, 3 pages.
Rumelhart et al., "Learning representations by back-propagating errors." nature 323.6088 (1986), 4 pages.
Santoro et al., "A Simple Neural Network Module for Relational Reasoning", dated Jun. 5, 2017, 16 pages.
TensorFlow, "TensorFlow 1.11", Get started with TensorFlow, https://www.tensorflow.org, last viewed on Oct. 18, 2018, 7 pages.
Ioffe, Sergey, and Christian Szegedy. "Batch normalization: Accelerating deep network training by reducing internal covariate shift." arXiv preprint arXiv:1502.03167 (2015), 11 pages.

\* cited by examiner

AUTOMATICALLY IDENTIFYING AND INTERACTING WITH HIERARCHICALLY ARRANGED ELEMENTS

FIELD OF THE DISCLOSURE

One technical field of the present disclosure is digital data processing in the field of computer-implemented business process automation and graphical user interfaces. Another technical field is automatically recognizing hierarchical relationships among visible elements in digital data and utilizing such hierarchical relationships to enhance digital data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, electronic forms having visible elements that can be interacted with are everywhere. Examples include web pages and forms presented by application programs implemented using software as a service (SaaS) techniques. The electronic forms enable directed communication of data having specific formats and thus facilitate data processing. For example, instead of a single narrative question of what the billing address is, an electronic form might instead present several fields corresponding to different portions of the billing address to be filled out. More generally, an electronic form contains one or more hierarchically arranged fields that are used to receive data. The data can be contents, such as a text segment or an image, or other signals, such as a mouse click, which could also lead to additional contents, such as a check for a check box. The hierarchical arrangement typically entails one or more groups of fields, with each group typically identified by a group label and each field possibly accompanied by a field label. For example, the electronic form could have a group of fields for the billing address and a group of fields for the shipping address. The electronic form could thus contain a group label of "Billing Address", a field label of "City", and an associated field for entering the city. The field is considered to be associated with the group label and the field label.

Different electronic forms might represent the same data with different hierarchical arrangements. For example, in one electronic form, the shipping address might come before the billing address or after the billing address. In another electronic form, the field label for the field to receive the country information in the billing address might be positioned above the field or to the left of the field.

Given the volume of electronic forms that need to be completed, it would be helpful to have a system that automatically understands which types of data is expected by an electronic form and completes the form without human intervention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS
3. EXAMPLE COMPUTER COMPONENTS
4. FUNCTIONAL DESCRIPTIONS
    4.1. CONSTRUCTING DIGITAL MODELS FOR RECOGNIZING HIERARCHICAL RELATIONSHIPS
    4.2. AUTOMATICALLY INTERACTING WITH HIERARCHICALLY ARRANGED VISIBLE ELEMENTS USING THE DIGITAL MODELS
5. EXAMPLE PROCESSES
6. HARDWARE IMPLEMENTATION 1. General Overview A visual relationship management server computer (server) and processing methods are disclosed. In some embodiments, the server is programmed to first create digital models for recognizing hierarchical relationships among form elements. A digital "model" in this context refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. More specifically, the server is programmed to receive a collection of images corresponding to electronic forms representing similar data and, for each image, detect objects that correspond to the form elements, such a field, a group label, or a field label. The server is programmed to further determine values of various attributes for each object, such as the type, the position, the original portion of the image represented by the object, or any text embedded in the object. The server is programmed to build the digital models from the objects detected from the collection of images and known hierarchical relationships among the objects. The digital models would determine that, given a first of these objects that has a type of a field (a field object) and a second of these objects that has a type of a group label (a group label object) or a field label (a field label object), how likely it is that the first object is associated with the second object. The digital models can include one or more neural networks that are configured to initially evaluate each pair of objects on an attribute basis, based on the evaluation results then assess each pair of objects on an object basis, and based on the assessment results determine, for each field object, the associated group label object and the associated field label object.

In some embodiments, given the digital models, the server is programmed to receive a specific image of a specific electronic form. The server is programmed to similarly detect specific objects from the specific image and compute the attribute values of the specific objects. The server is programmed to next feed each pair of the specific objects of one field object and a group label object or a field label object to the digital models and determine how the objects are associated with one another, which determines which fields in the specific form are associated with which group labels or which field labels. The server is programmed to then search a database for data to be associated with each of the fields based on the associated group label and the associated field label, and perform necessary actions based on the search result. For example, the search result might indicate that a specific field should be filled with specific text or receive a mouse click.

The server offers several technical benefits and improvements over past approaches. The server is programmed to apply rigorous digital models in a tiered, attribute-based approach to analyze hierarchical relationships among form elements. The rigor of the digital models allows various electronic forms expecting similar data but having variable arrangements to be recognized and still produce highly accurate results. The automatic, tiered approach streamlines the analysis and effectively reduces the model parameter space, thus enabling efficient parsing and completion of electronic forms. The accurate and efficient processing reduces computational time for recognizing the electronic forms, completing the electronic forms, and making corrections to the electronic forms. By being able to process a large variety and volume of forms, which might have elements that expect content data, graphical user interface signals, or other interactions with the form elements, the server also facilities the intake and processing of digital data. Consequently, a variety of computer-implemented workflows and business processes, which require entering data in an electronic form or a succession of electronic forms, can be fully automated.

2. Example Computing Environments

Figure 1:
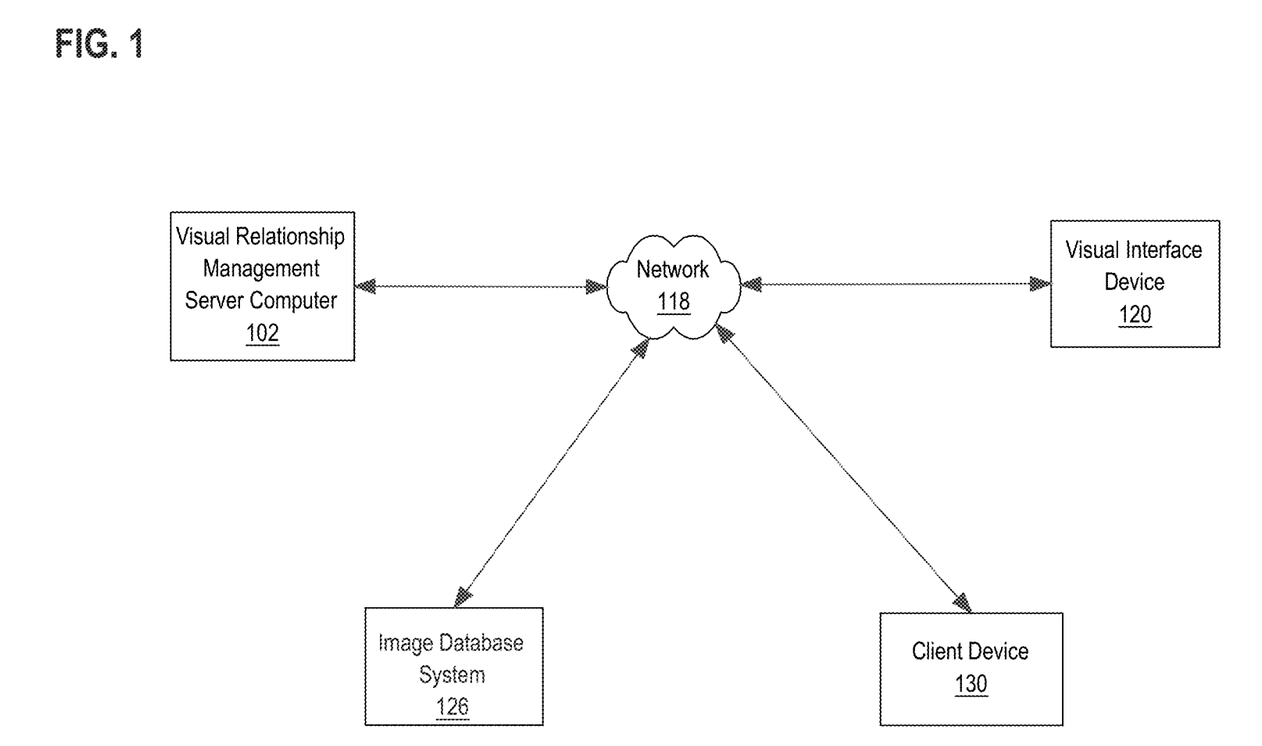
FIG. 1 illustrates an example networked computer system in which various embodiments may be practiced.

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a visual relationship management server computer 102 (server), a visual interface device 120, an image database system 126, and a client device 130, which are communicatively coupled directly or indirectly via one or more networks 118.

In some embodiments, the server 102 broadly represents one or more computers, virtual computing instances, and/or instances of a server-based application that is programmed or configured with data structures and/or database records that are arranged to host or execute functions including but not limited to constructing and applying digital models for recognizing hierarchical relationships among form elements to complete electronic forms. The server 102 can comprise a server farm, a cloud computing platform, a parallel computer, or any other computing facility with sufficient computing power in data processing, data storage, and network communication for the above-described functions.

In some embodiments, the client device 130 is programmed to submit a request to the server 102 for processing one or more electronic forms. The request could include electronic forms or links to where the electronic forms are stored. The processing could be for building or applying the digital models for recognizing hierarchical relationships among form elements. The client device 130 can be further programmed to receive the results of applying the digital models, including completed electronic forms. The client device 130 may comprise any type of computing device with sufficient computing power in data processing, data storage, and network communication for the above-described functions, such as a desktop computer, laptop computer, tablet computer, smartphone, or wearable device.

In some embodiments, the image database system 126 is programmed to offer images for training and constructing the digital models for recognizing hierarchical relationships among form elements. The image database system 126 is typically associated with a third party and offers a public interface. The image database system 126 may comprise any type of computing device with sufficient computing power in data processing, data storage, and network communication for the above-described functions.

In some embodiments, the visual interface device 120 is programmed to cause or handle displaying an electronic form, whether in an empty state or a completed state. For example, when completing a form requires a graphical user interface (GUI) instead of an application programming interface (API), the visual interface device 120 can be configured to manage the GUI in completing the form. The visual interface device 102 may comprise any type of computing device with sufficient computing power in data processing, data storage, and network communication for the above-described functions.

The networks 118 may be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive a collection of images of electronic forms from the client device 130 or the image database system 126. The server 102 is programmed to then build and store digital models for recognizing hierarchical relationships among form elements based on the collection of images. Subsequently, the server is programmed to receive a request to process an electronic form from the client device 130. The server 102 is programmed to then run the electronic form through the digital models to determine the hierarchical relationships among the form elements, specifically how each field in the form is associated with a field label or a group label. The server 102 is programmed to then complete the form based on the determining, possibly sending the electronic form and the data expected by the electronic form to the visual interface device 120 and receiving the complete electronic form from the visual interface device 120. The server 102 is programmed to finally send the complete electronic form or a notification thereof to the client device 102. Alternatively, the server 102 can send the digital models to the client device 130 for completion of an electronic form by the client device 130.

3. Example Computer Components

Figure 2:
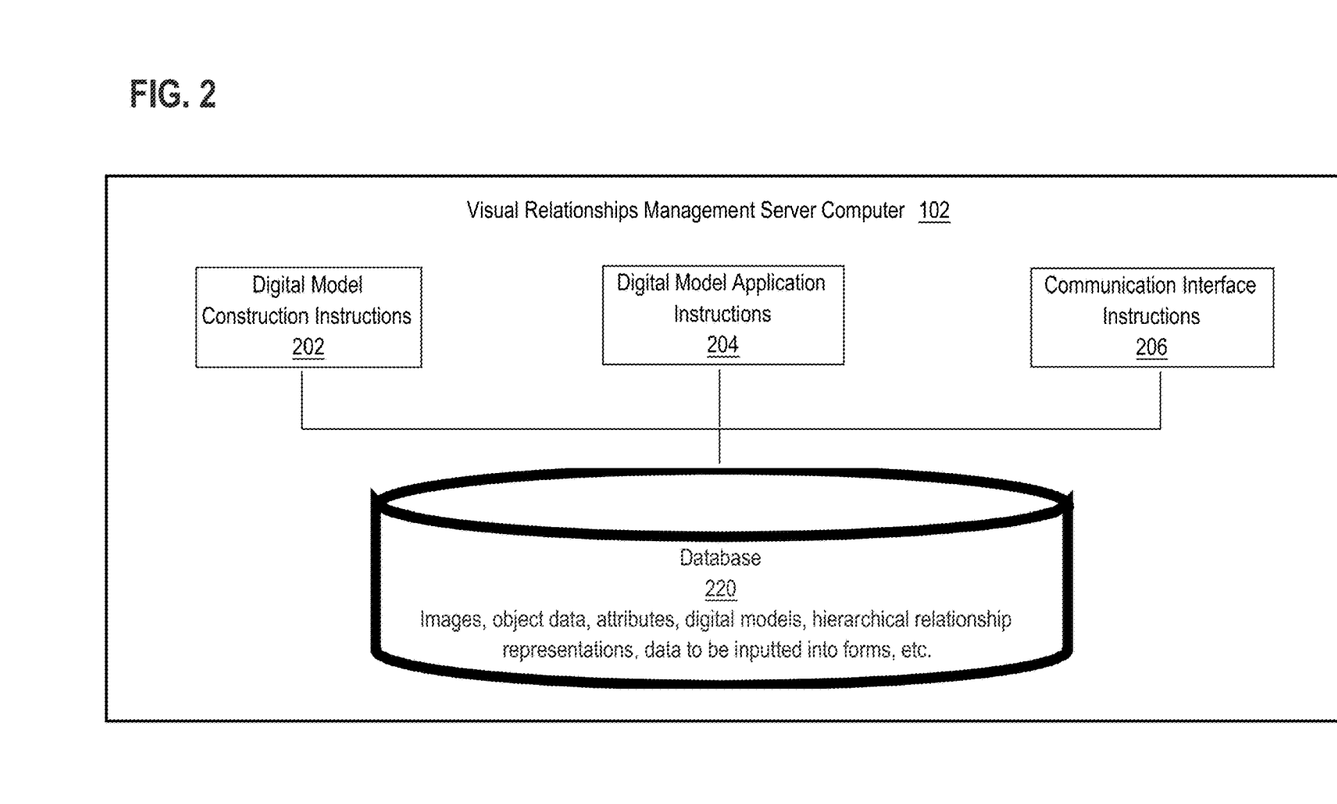
FIG. 2 illustrates example computer components of a visual relationship management server computer in accordance with the disclosed embodiments.

FIG. 2 illustrates example components of the claim processing server computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise digital model construction instructions 202, digital model application instructions 204, and communication interface instructions 206. In addition, the server 102 can comprise a database 220.

In some embodiments, the digital model construction instructions 202 enable construction of digital models for recognizing hierarchical relationships among form elements. A field may be associated with a field label, which may be considered as siblings at the same level in the hierarchy. A field may also be associated with a group label, with the field considered as a child at a lower level and the group label considered as a parent at a higher level in the hierarchy. More specifically, the digital model construction instructions enable the collection of images corresponding to electronic forms, detection of objects from the images, determination of object attribute values, collection of relationship data representing hierarchical relationships among the objects, and building the digital models based on the object attribute values and the relationship data.

In some embodiments, the digital model application instructions 204 enable application of the digital models for recognizing hierarchical relationships among form elements. More specifically, the digital model application instructions enable receipt of an image for an electronic form, detection of objects from the image, determination of object attribute values, application of the digital models based on the object attribute values, and completion of the electronic form.

In some embodiments, the communication interface instructions 206 enable communication with other devices. Such communications may include receiving images from a client device or an image database system, receiving a request from the client device for completing an electronic form, sending the electronic form to a visual interface device, receiving a completed form from the visual interface device, or sending the completed form to the client device.

In some embodiments, the database 220 is programmed or configured to manage relevant data structures and store relevant data for functions performed by the server 102. The relevant data may include images, object data, object attribute values, digital models, hierarchical relationship representations, data to be inputted into electronic forms, data related to client devices, image database systems, or visual interface devices, and so on.

4. Functional Descriptions 4.1 Constructing Digital Models for Recognizing Hierarchical Relationships In some embodiments, the visual relationship management server computer (server) is programmed to receive a collection of images, each capturing a set of hierarchically arranged elements. Each image can come from a client device or an image database system. Each image could be a fillable electronic form converted into an image format, such as an electronic form in PDF converted into an image in JPG, PNG, TIF, or any of the image file types. The image could also be a screenshot of a graphical user interface (GUI). The image could also be a photo of any set of hierarchically arranged elements. The image can generally be represented as a multi-dimensional matrix, where two of the dimensions correspond to positional information and the other dimensions correspond to the value at a specific position.

In some embodiments, the server 102 is programmed to identify objects corresponding to the form elements from each image. Each object may have a type, such as a field, a field label (label), or a group label (group). A field is an area where data is to be inputted. A field is often accompanied by a field label to indicate the nature of the data to be inputted, but the field label may not be present. A field is typically located next to the associated field label, within a certain distance from the field label and vertically or horizontally aligned with the field label. The fields or associated field labels can be associated with a group label. A field and an associated group label may also be located within a specific distance. Each object can have additional attributes, such as a position, a size, a shape, or a color. When the object is associated with more than a pixel or other basic unit of the image, each of these attributes may have a value representing an aggregate over the pixels or multiple values representing multiple pixels associated with the object. For example, when an object is defined as a box, the position of the object within the image can have four values corresponding to the four vertices of the box or four values (x, y, w, h), where (x, y) is the coordinate of the upper-left vertex, w is the width, and h is the height of the box. In addition, each object can have data attributes, such as the original portion of the image represented by the object or the text embedded in the object. The server 102 can be programmed to apply an object detection technique known to someone skilled in the art to obtain information regarding a set of objects from the image, such as utilizing the functions in the TensorFlow Object Detection API to obtain, for each object, a class or type, a position, or a detection confidence score.

In some embodiments, the server 102 is programmed to extract text segments from each image, which typically correspond to those objects having a type of a field label or a group label. More specifically, the server 102 can be configured to apply an optical character recognition (OCR) technique known to someone skilled in the art, such as utilizing the functions provided by the Tesseract engine or in the Google Cloud Vision API. The extraction of text segments can be performed as part of the object detection discussed above. Alternatively, the objects can be first identified as bounding boxes, and the text segments within the bounding boxes can then be extracted.

In some embodiments, the server 102 is programmed to directly receive a plurality of objects detected from a collection of images of electronic forms from a data source. In other embodiments, the server 102 is programmed to also directly receive attribute values for the plurality of objects.

In some embodiments, the server 102 is programmed to receive, for each field object detected from the collection of images, an association with a field label object and an association with a group label object detected from the collection of images.

Figure 3:
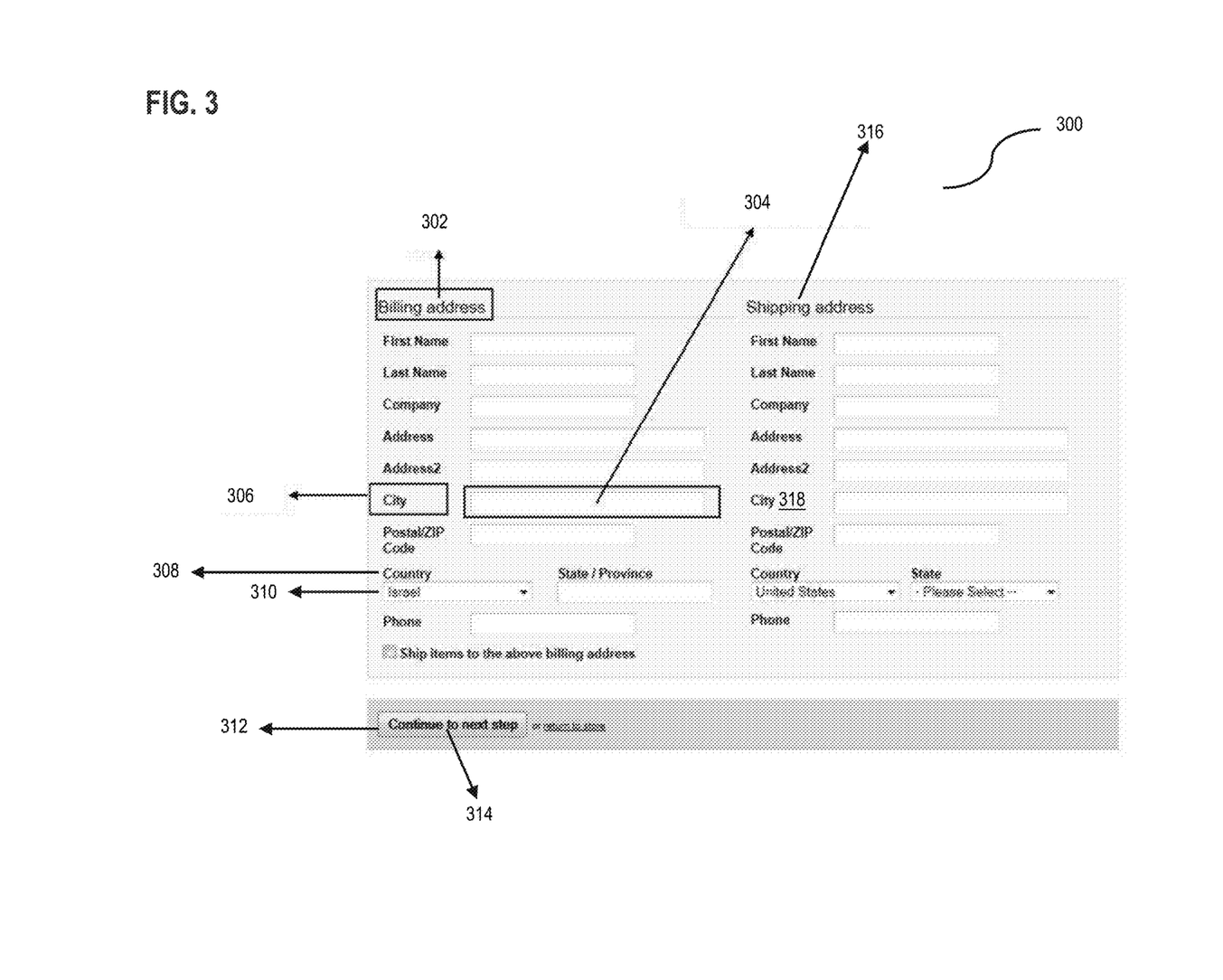
FIG. 3 illustrates an example set of hierarchically arranged elements in an electronic form.

FIG. 3 illustrates an example set of hierarchically arranged elements in an electronic form. The form 300 could be a PDF document or a Web page, for example. The form 300 has two groups, a first group for the billing address on the left of the form, as identified by the group label 302, and a second group for the shipping address on the right of the form, as identified by the group label 316. Each of these group labels is not associated with any individual field. These example groups illustrate that some field labels or fields can appear identical except that they belong to different groups, such as the field label 306 of "City" and the field label 318 of "City". The first group includes a field 304 for inputting a city, and an associated field label 306 of "City". In this example, the field label 306 appears to the left of the field 304. In another example, the field label 308 appears above the associated field 310. In yet another example, the field label 314 appears to coincide with the associated field 312. Therefore, these example associations illustrate the different positional relationships that could exist between a field and an associated field label. Each object in this form 300 can be identified by a bounding box, as illustrated by 302 for a group label, 304 for a field, and 306 for a field label.

Figure 4A:
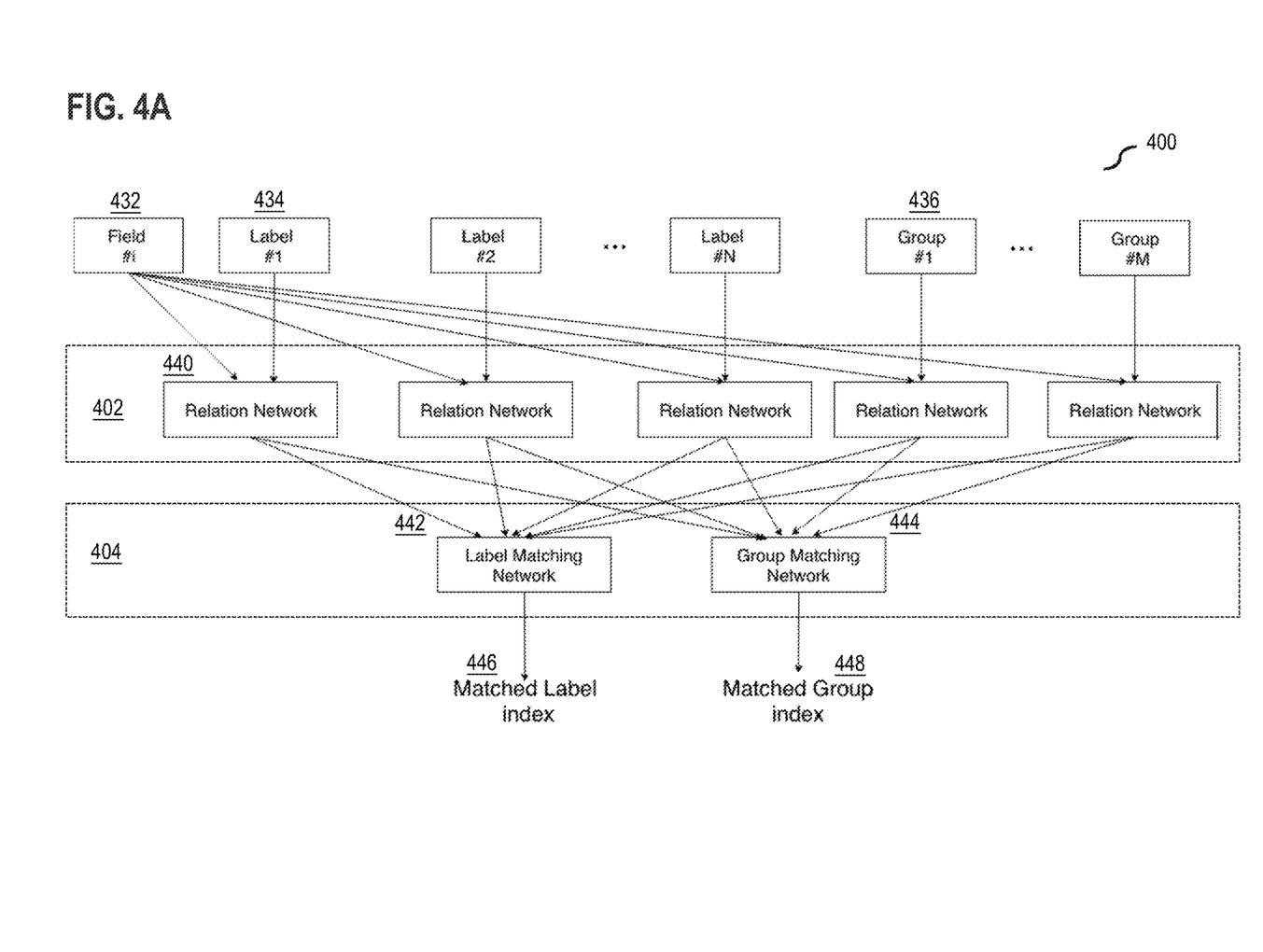
FIG. 4A illustrates an example digital model for recognizing associations between a field and an associated field label and an associated group label.

In some embodiments, the server is programmed to build and store a digital model for recognizing associations between a field and a field label or a group label. FIG. 4A illustrates an example digital model for recognizing associations between a field and an associated field label and an associated group label. The digital model 400 can comprise two levels. In the first level 402, the digital model 400 can comprise multiple instances of a sub digital model 440 (relation network) to connect and learn from a pair of objects, such as the object 432 having a type of a field and the object 434 having a type of a field label or the object 436 having a type of a group label based on multiple attributes of an object, as further discussed with respect to FIG. 4B. In the second level 404, the digital model 400 can comprise a sub digital model 442 (label matching network) that determines, out of all the pairs of objects sharing a specific object having a type of a field, such as the object 432, which pair and thus which corresponding field label object having an index of 446 is associated with the specific object and similarly a sub digital model 444 (group matching network) that determines, out of all the pairs of objects sharing a specific object having a type of a field, which pair and thus which corresponding group label object having an index of 448 is associated with the specific object. Information regarding the group label and information regarding the field label can combine to help determine whether a pair objects are associated with each other. For example, the group corresponding to the group label of "Billing Address" might have a unique field label of "Country" that is not associated with the group corresponding to the group label of "Shipping Address" because shipping to only one country is allowed. For further example, a group of elements might have the same unique fonts, and thus a group label and a field label associated with the same field might have the same unique font.

Figure 4B:
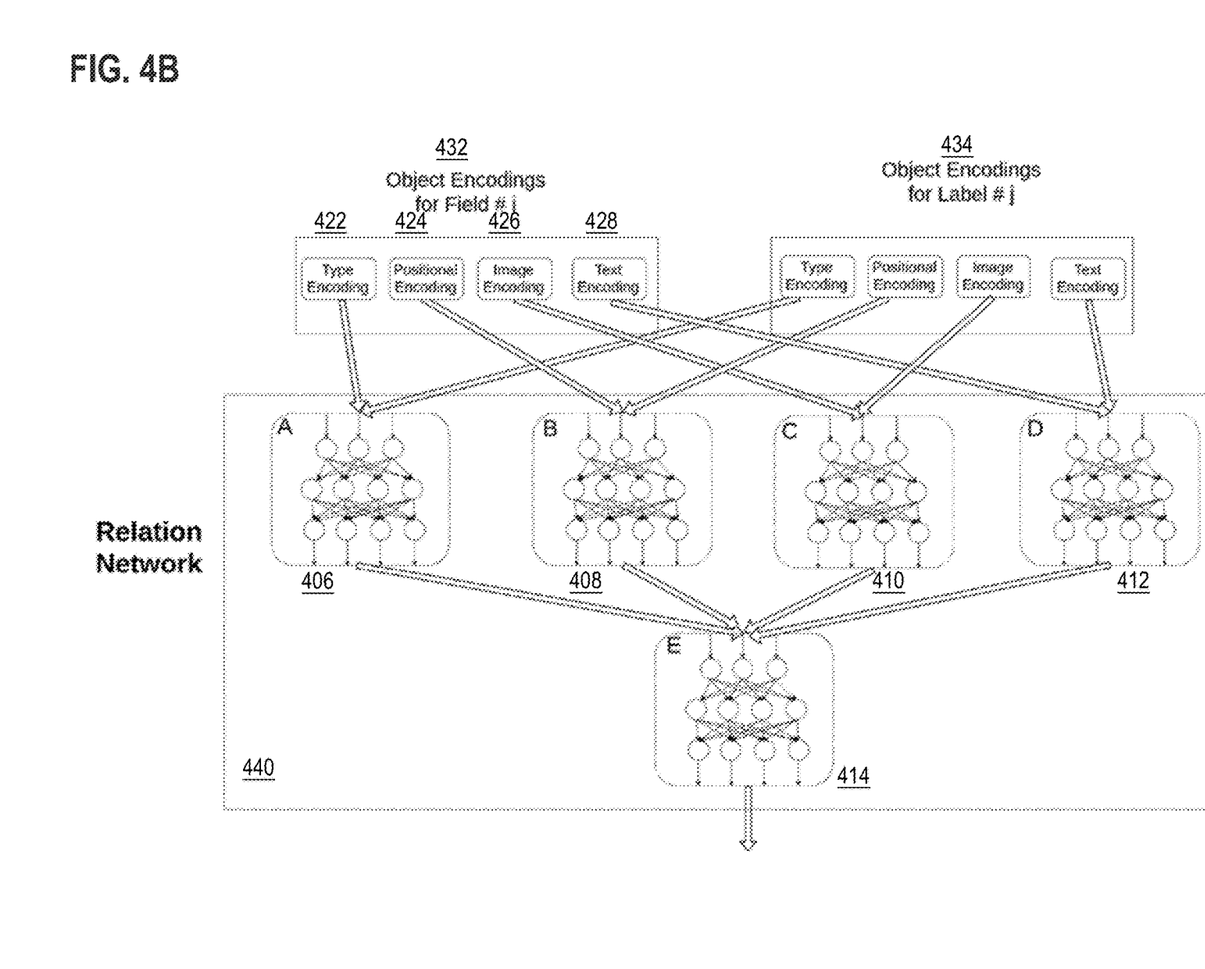
FIG. 4B illustrates a relation network or a sub digital model in the first level of the digital model illustrated in FIG. 4A.

FIG. 4B illustrates a relation network or a sub digital model in the first level of the digital model illustrated in FIG. 4A. In some embodiments, the sub digital model 440 can comprise multiple sub digital models, each configured to connect and learn from a pair of objects, such as the object 432 having a type of a field and the object 434 having a type of a field label or the object 436 having a type of a group label, based on one attribute of an object. For example, there can be a sub digital model 406 for the type, a sub digital model 408 for the position, a sub digital model 410 for the original portion of the image, or a sub digital model 412 for the embedded text. The type data can be used to distinguish between a field label and a group label. The position data can reveal the relative positions in terms of distance and alignment and can be highly indicative of whether an association exists. The image data may reveal additional information, such as the shape, the font, or the density that might be characteristic of a grouping of fields or a mapping between fields and field labels. The text data, which is generally applicable to field label objects or group label objects, can reveal similar information as the image data. In addition, there can be a sub digital model 414 for processing the combination of outputs of the other sub digital models in the relation network, such as the sub digital models 406, 408, 410, and 412, to connect and learn from the pair of objects, such as the object 432 having a type of a field and the object 434 having a type of a field label or the object 436 having a type of a group label, based on multiple attributes of an object. Different attributes can combine to help determine whether a pair objects are associated with each other. For example, a type of a group label instead of a field label for one of the pair of objects may be highly correlated with a relatively large distance between the pair of objects, or an embedded text of "Street Address" instead of "Zip Code" for one of the pair objects may be highly correlated with a relatively large size for the other object having a type of a field.

In some embodiments, the sub digital models 406, 408, 410, and 412 can be skipped to connect and learn from a pair of objects directly based on multiple attributes. In certain embodiments, each of the sub digital models 406, 408, 410, and 412 can accept three, instead of two, of a field object, a group label object, and a field label object, and the sub digital models 442 and 444 can be merged into one. The server 102 can be programmed to combine multiple attributes or multiple types of objects in other orders or manners.

In some embodiments, the server 102 is programmed to build the digital model 400 using all the objects detected from each of the collection of images. For each image, the server 102 is programmed to feed all possible pairs of objects, each including a field object, to the relation network, running multiple instances concurrently. For each field object, the sub digital model 442 is expected to produce the received association with a field label object, and the sub digital model 444 is expected to produce the received association with a group label object. In this manner, the digital model 400 comprising all the sub digital models is trained as a whole.

In some embodiments, the input to each of the sub digital models 406, 408, 410, and 412 would be a feature vector including a value for an attribute of an object for each of a pair of objects, including a specific object having a type of a field. Such a value can be encoded using any technique known to someone skilled in the art. For example, a value for the type of an object can be encoded by assigning "001" to a field, "010" to a field label, and "100" to a group label as the type encoding 422. For example, a value of [x, y, w, h] for the location of an object does not need to be specifically encoded but could be normalized by using [x', y', w h'] as the positional encoding 424, where x'=x/img_w, y'=y/img_h, w'=w/img_w, and h'=h/img_h, and where img_w and img_h are the width and height of the image from which the object is detected. For example, a value for a portion of the image represented by the object does not need to be specifically encoded but can be normalized by dividing each pixel value by a maximum possible value as the image encoding 426. For a color image with three channels, each pixel value can be divided by 255. For example, a value for a text segment embedded in an object can be encoded as the text encoding 428 using Word2Vec or the GloVe method. The value for a text segment can also be normalized semantically. For example, "zip code" and "postal code" generally have the same meaning, and each could be converted to a predefined value. The semantic normalization can be performed based on a given dictionary that maps every text segment to a normalized value.

In some embodiments, the output from each of the sub digital models 406, 408, 410, and 412 would represent a learned pairing or connection of two objects in terms of one attribute, such as a transformation of a combination of two encodings. The input to the sub digital model 414 would include the output from each of the sub digital models 406, 408, 410, and 412. The output from the sub digital model 414 would represent a learned pairing or connection of two objects in terms of multiple attributes, such as a transformation of a combination of eight encodings for four attributes. The input to the sub digital model 442 or the sub digital model 444 would include the output from the sub digital model 414 for each pair of objects sharing that specific object having a type of a field. The output from the sub digital 442 416 would include a value corresponding to an object having a type of a field label that is deemed to be associated with the specific object. The output from the sub digital model 444 would include a value corresponding to an object having a type of a group label that is deemed to be associated with the specific object. For training purposes, the server 102 is programmed to receive all output values to be produced by the sub digital model 442 and the sub digital model 444. The value corresponding to an object can also be encoded using any technique known to one skilled in the art. For example, a value identifying an object can be encoded by assigning "00001" to the first object, "00010" to the second object, "00100" to the third object, "01000" to the fourth object, and "10000" to the first object. When a field has no associated field label or group label, a corresponding value for can be encoded by assigning "00000" to no object.

In some embodiments, a sub digital model is implemented as a neural network. For example, the sub digital model 406 for the type, the sub digital model 408 for the position, or the sub digital model 414 for aggregation can be implemented as a stack of pairs of a fully connected layer followed by a nonlinear activation function, such as sigmoidal or rectified linear unit (RELU) activation functions. The sub digital model 410 for the original portion of the image can be implemented as a convolutional neural network having a series of stacks of pairs of a convolutional layer followed by a RELU activation function, with a pooling layer attached to the end of each stack for nonlinear down sampling. The sub digital model 412 for the text embedded in the object can be implemented as a long short-term memory (LSTM) neural network. The sub digital model 442 or 444 can be implemented in a similar manner as the sub digital model 406, 408, or 414, except that in the last pair, the nonlinear activation function is replaced by a softmax function to convert the neural network output into probabilities. The object having a type of a field label or a group label that receives the highest probability is taken to be associated with the specific object having a type of a field. In other embodiments, one or more of the sub digital models can be implemented by other machine learning techniques known to someone skilled in the art, such as logistic regression methods or support vector machines.

In some embodiments, the sub digital models discussed above can be implemented using various techniques for managing neural networks known to someone skilled in the art, such as the functions in Tensorflow, Keras, PyTorch, Caffe, or MxNet, or other open-source libraries. In addition, the cost function for training the sub digital model 442 and the sub digital model 444 can be the sum of the cross-entropy loss from both of the sub digital models. The optimization of the digital model can be performed using mini-batch back-propagation or variants, such as using a momentum, Adaptive Moment Estimation (ADAM), or Root Mean Square Propagation (RMSprop). Applying weights initialization methods, such as Xavier Initialization or He Initialization, could accelerate the training process. Applying regularization methods, such as Dropout or batch normalization, could reduce the overfitting problems of the digital model.

4.2 Automatically Interacting with Hierarchically Arranged Visible Elements Using the Digital Models In some embodiments, the server 102 is programmed to manage field data in a storage device that correspond to field objects. The correspondence can be established by identifying the group label object and the field label object associated with a field object. For example, for a field associated with a group label of "Billing Address" and a field label of "City", the field data can be stored in a database table having one or more columns corresponding to "Billing Address" and "City". The server 102 can be programmed to receive the field data in batch for a number of fields as contents, such as text segments or images, or instructions for providing other signals, such as GUI interactions. The server 102 can also be programmed to receive the field data from actual user interaction with electronic forms. For example, the digital model can be applied to previously filled-out forms to extract the filled-in data.

In some embodiments, the server 102 is programmed to receive a new electronic form to be filled out or otherwise interacted with. The server 102 can be programmed to first detect the objects in the electronic form and determine object attributes, as discussed in Section 4.1. The server 102 can be programmed to then feed the set of objects to the digital model to determine how the fields in the electronic form are associated with field labels or group labels, as further discussed in Section 4.1.

Figure 5A:
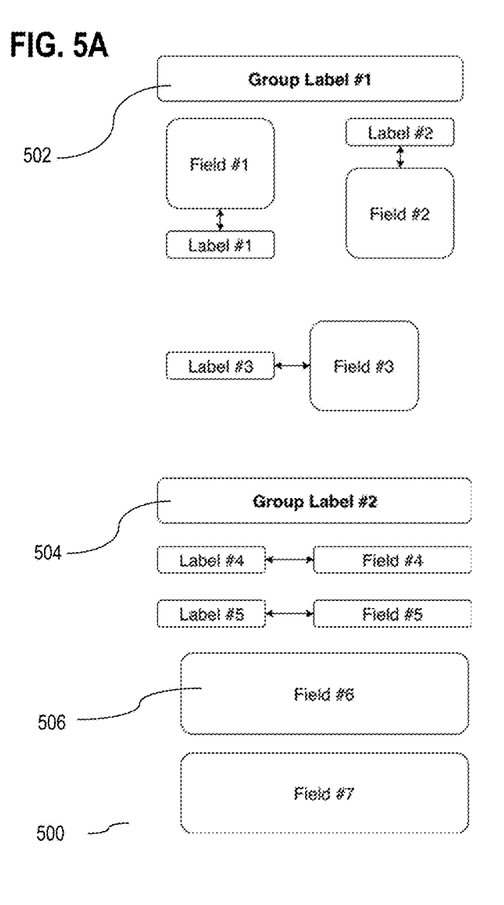
FIG. 5A illustrates an example set of objects detected from a form.
Figure 5B:
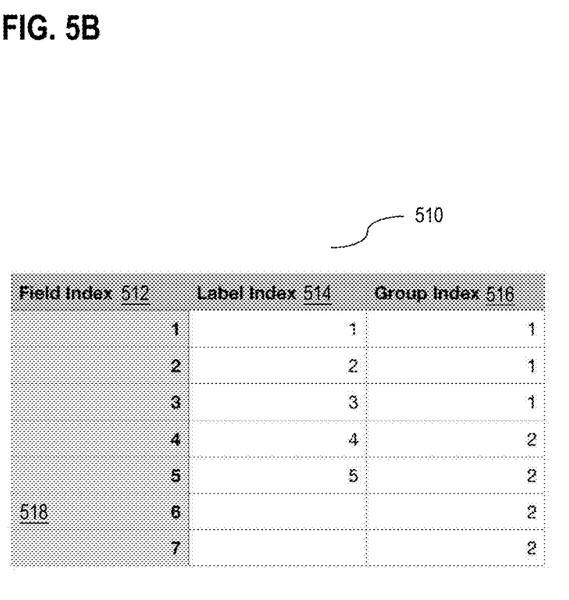
FIG. 5B illustrates an example set of outputs produced by the digital model for recognizing hierarchical relationships among the set of visible objects.

FIG. 5A illustrates an example set of objects detected from an electronic form. FIG. 5B illustrates an example set of outputs produced by the digital model for recognizing hierarchical relationships among the set of objects. The electronic form includes two groups of fields and accompanying field labels, thus the set of detected objects 500 includes an object 502 and an object 504 each having a type of a group label. Each of the groups includes several fields and field labels. In particular, not every field is associated with a field label, and thus the object 506 having a type of a field is not associated with any object having a type of a field label. The output of sending the set of objects to the digital model, as discussed above, is shown the table 510. The table 510 includes a row for each object having a type of a field, and for each such object indicates the index of the object in the column 512, the index of an associated object having a type of a field label in the column 514, and the index of an associated object having a type of a group label in the column 516. For example, the row 518 corresponds to field #6, which as noted above is not associated with any object having a type of a field label and thus has no value in the column 514.

In some embodiments, after determining how each field in an electronic form is associated with a group label or a field label, the server 102 is programmed to obtain field data from the database regarding how to fill out or otherwise interact with the field based on information identifying the associated group label or the associated field label. The server 102 can be programmed to normalize the field label or group label semantically before consulting the database, when the semantic normalization is not performed before application of the digital model and when field data is not stored repetitively in the database in columns having semantically identical names. The server 102 is programmed to next automatically complete the form, which means interacting with one or more fields of all the fields in the electronic form. For example, for a textual form, the field data may include specific text data, which can be inputted into or otherwise associated with the field. For a graphical form, the field may include specific instructions for interacting with the field, such as effecting a click, which can be performed on the field.

5. Example Processes

Figure 6:
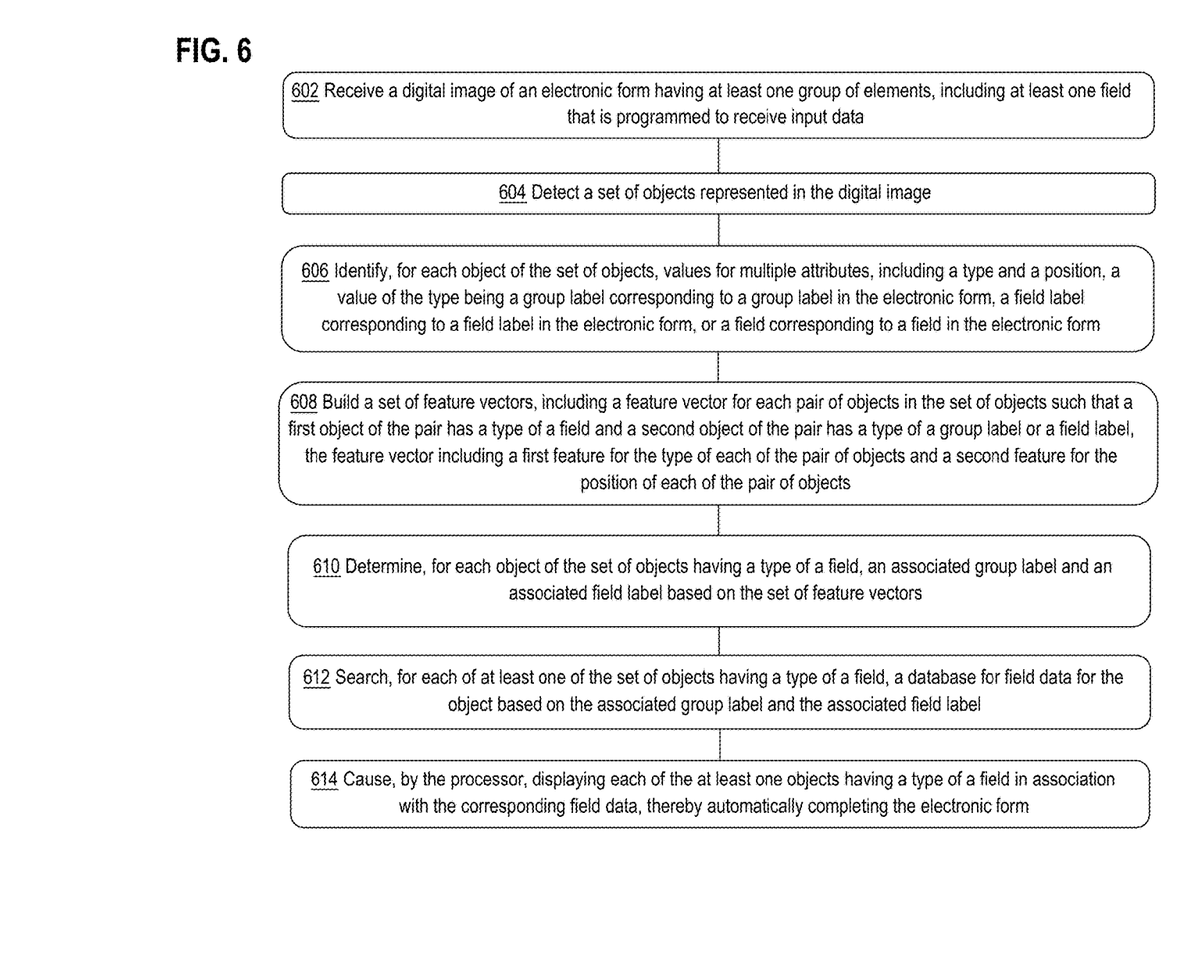
FIG. 6 illustrates an example process performed by the visual relationship management server computer of managed hierarchically arranged objects.

FIG. 6 illustrates an example process performed by the visual relationship management server computer of managed hierarchically arranged objects. FIG. 6 is shown in simplified, schematic format for purposes of illustrating a clear example and other embodiments may include more, fewer, or different elements connected in various manners. FIG. 6 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 602, the server 102 is programmed or configured to receive a digital image of an electronic form having at least one group of elements, including at least one field that is programmed to receive input data. The electronic form would be in an incomplete state, with at least some of the fields to be filled out or interacted with.

In some embodiments, in step 604, the server 102 is programmed or configured to detect a set of objects represented in the digital image. In step 606, the server 102 is programmed or configured to identify, for each object of the set of objects, values for multiple attributes, including a type and a position. The value of the type can be a group label corresponding to a group label in the electronic form that identifies a group of form elements, a field label corresponding to a field label in the electronic form that identifies or informs a field in the electronic form, or a field corresponding to a field in the electronic form used to receive data. The position generally indicates where the object is within the image. When the object takes the form of a bounding box, the position can indicate the coordinates of the vertices.

In some embodiments, in step 608, the server 102 is programmed or configured to build a set of feature vectors, including a feature vector for each pair of objects in the set of objects such that a first object of the pair has a type of a field and a second other object of the pair has a type of a group label or a field label, the feature vector including a first feature for the type of each of the pair of objects and a second feature for the position of each of the pair of objects. More specifically, the server 102 is programmed to pair each field object with every field label object and every group label object, starting with feature-by-feature pairing.

In some embodiments, in step 610, the server 102 is programmed or configured to determine, for each object of the set of objects having a type of a field, an associated group label and an associated field label based on the set of feature vectors. More specifically, the server 102 is programmed to determine the associated group label and the associated field label simultaneously from all the pairs for each field object.

In some embodiments, in step 612, the server is programmed or configured to search, for each of at least one of the set of objects having a type of a field, a database for field data for the object based on the associated group label and the associated field label. In step 614, the server is programmed or configured to cause displaying each of the at least one objects having a type of a field in association with the corresponding field data, thereby automatically completing the electronic form. The field data can be content data, such as images or text segments, or instructions for GUI interactions. Causing displaying a field object in association with the corresponding field data may comprise causing displaying the corresponding field with the content data or applying the GUI interactions to the corresponding field.

6. Hardware Implementation

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
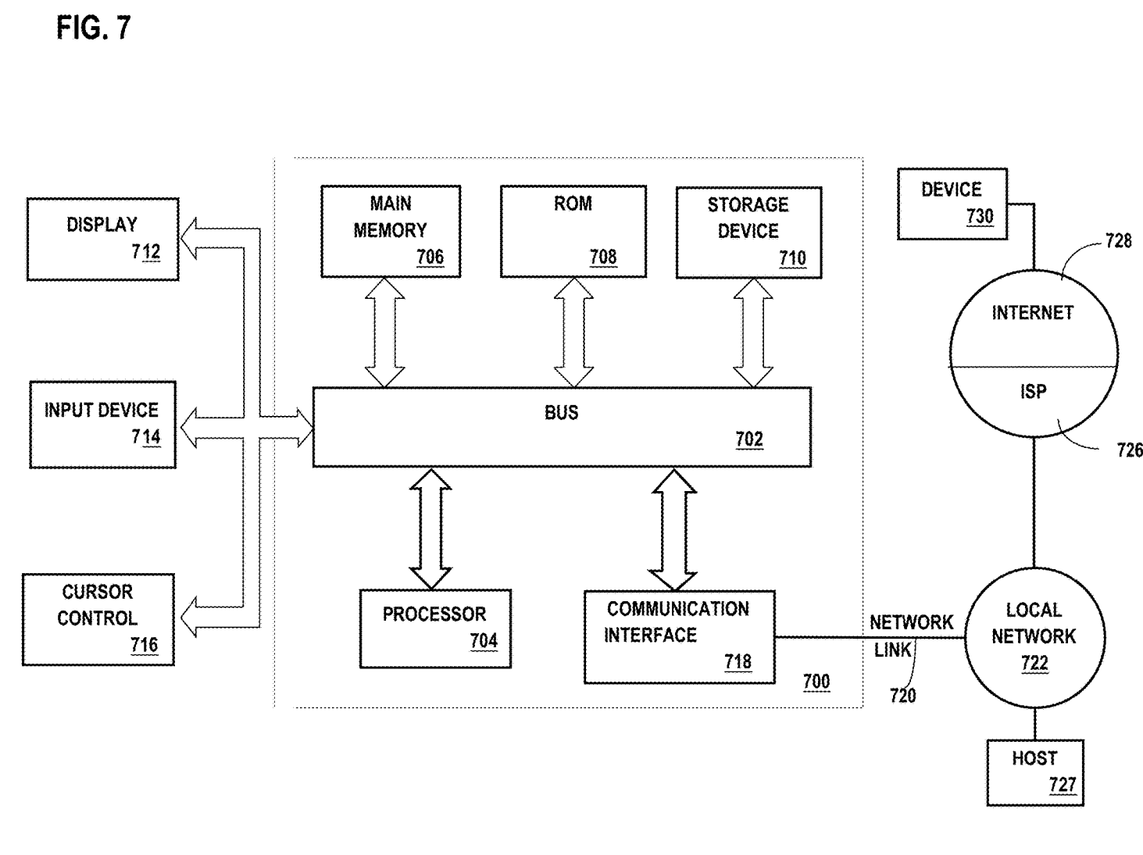
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 727 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a device 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of recognizing and completing electronic forms, comprising:
   receiving, by a processor, a digital image of an electronic form having a hierarchy of at least one group of elements, including at least one field that is programmed to receive input data;
   detecting, by the processor, a set of objects represented in the digital image;

identifying, for each object of the set of objects, values for multiple attributes, including a type and a position, a value of the type being a group label corresponding to a group label in the electronic form, a field label corresponding to a field label in the electronic form, or a field corresponding to a field in the electronic form;

building a set of feature vectors, including a first feature vector that represents a first pair of objects in the set of objects such that a first object of the first pair has a type of a field and a second object of the first pair has a type of a group label, and a second feature vector that represents a second pair of objects in the set of objects such that a first object of the second pair has a type of a field and a second object of the second pair has a type of a field label;

determining, for each object of the set of objects having a type of a field, an associated group label at a higher level of the hierarchy and an associated field label at a lower level of the hierarchy based on the set of feature vectors;

searching, for each of at least one of the set of objects having a type of a field, a database for field data for the object based on the associated group label at a higher level of the hierarchy and the associated field label at a lower level of the hierarchy;

causing, by the processor, displaying each of the at least one objects having a type of a field in association with the corresponding field data, thereby automatically completing the electronic form.

2. The computer-implemented method of claim 1, further comprising:
a specific object of the set of objects being in a form of a bounding box,
the position of the specific object identifying a location of the bounding box within the digital image.

3. The computer-implemented method of claim 1, further comprising:
the multiple attributes further including a portion of the digital image represented by the object and a text segment embedded in the object,
the feature vector further including a feature for the portion of the digital image of each of the pair of objects and a feature for the text segment of each of the pair of objects.

4. The computer-implemented method of claim 1, the determining further comprising:
connecting each pair of objects in the set of objects such that one object in the pair has a type of a field and the other object in the pair has a type of a group label or a field label based on each of the multiple attributes,
combining the two objects in each of the pair of objects based on the connecting,
selecting, for each of the set of objects having a type of a field, an associated object having a type of a group label and an associated object having a type of a field label based on the combining.

5. The computer-implemented method of claim 4, the connecting further comprising applying, for each of the pairs of objects, an instance of a neural network for each of the multiple attributes, including a certain neural network having a stack of pairs of a fully connected layer followed by a nonlinear activation function.

6. The computer-implemented method of claim 4, the combining further comprising applying, for each of the pairs of objects, an instance of a neural network having a stack of pairs of a fully connected layer followed by a nonlinear activation function.

7. The computer-implemented method of claim 4, the selecting further comprising applying a first neural network that identifies an object having a type of a group label and a second neural network that identifies an object having a type of a field label.

8. The computer-implemented method of claim 7, further comprising each of the first neural network and the second neural network having a stack of pairs of a fully connected layer followed by a nonlinear activation function except that in a last pair, the nonlinear activation function is replaced by a softmax function.

9. The computer-implemented method of claim 7, further comprising each of the first neural network and the second neural network receiving all results of the combining as input.

10. The computer-implemented method of claim 1, further comprising the associated group label corresponding to no group label or the associated field label corresponding to no field label.

11. The computer-implemented method of claim 1, further comprising storing data in the database indexable by a group label and a field label.

12. The computer-implemented method of claim 1, the causing further comprising causing filling a field in the electronic form corresponding to an object having a type of field with content data or causing interacting with the field.

13. One or more non-transitory storage media storing instructions which, when executed by one or more computing devices, cause performance of a method of recognizing and completion of electronic forms, the method comprising:
receiving, by a processor, a digital image of an electronic form having a hierarchy of at least one group of elements, including at least one field that is programmed to receive input data;
detecting, by the processor, a set of objects represented in the digital image;
identifying, for each object of the set of objects, values for multiple attributes, including a type and a position, a value of the type being a group label corresponding to a group label in the electronic form, a field label corresponding to a field label in the electronic form, or a field corresponding to a field in the electronic form;
building a set of feature vectors, including a first feature vector that represents a first pair of objects in the set of objects such that a first object of the first pair has a type of a field and a second object of the first pair has a type of a group label, and a second feature vector that represents a second pair of objects in the set of objects such that a first object of the second pair has a type of a field and a second object of the second pair has a type of a field label;
determining, for each object of the set of objects having a type of a field, an associated group label at a higher level of the hierarchy and an associated field label at a lower level of the hierarchy based on the set of feature vectors;
searching, for each of at least one of the set of objects having a type of a field, a database for field data for the object based on the associated group label at a higher level of the hierarchy and the associated field label at a lower level of the hierarchy;
causing, by the processor, displaying each of the at least one objects having a type of a field in association with the corresponding field data, thereby automatically completing the electronic form.

14. The one or more non-transitory storage media of claim 13, the method further comprising:

the multiple attributes further including a portion of the digital image represented by the object and a text segment embedded in the object, the feature vector further including a feature for the portion of the digital image of each of the pair of objects and a feature for the text segment of each of the pair of objects.

15. The one or more non-transitory storage media of claim 13, the determining further comprising:

connecting each pair of objects in the set of objects such that one object in the pair has a type of a field and the other object in the pair has a type of a group label or a field label based on each of the multiple attributes, combining the two objects in each of the pair of objects based on the connecting, selecting, for each of the set of objects having a type of a field, an associated object having a type of a group label and an associated object having a type of a field label based on the combining.

16. The one or more non-transitory storage media of claim 15, the connecting further comprising applying, for each of the pairs of objects, an instance of a neural network for each of the multiple attributes, including a certain neural network having a stack of pairs of a fully connected layer followed by a nonlinear activation function.

17. The one or more non-transitory storage media of claim 15, the selecting further comprising applying a first neural network that identifies an object having a type of a group label and a second neural network that identifies an object having a type of a field label.

18. The one or more non-transitory storage media of claim 17, the method further comprising each of the first neural network and the second neural network having a stack of pairs of a fully connected layer followed by a nonlinear activation function except that in a last pair, the nonlinear activation function is replaced by a softmax function.

19. The one or more non-transitory storage media of claim 17, the method further comprising each of the first neural network and the second neural network receiving all results of the combining as input.

20. The one or more non-transitory storage media of claim 13, the method further comprising each of the first feature vector and the second feature vector containing multiple features that correspond to the multiple attributes.

* * * * *